(12) United States Patent
Wei et al.

(10) Patent No.: US 10,903,659 B2
(45) Date of Patent: Jan. 26, 2021

(54) CONTROL OF ENERGY PRODUCTION ERRORS IN A WIND PARK

(71) Applicant: VESTAS WIND SYSTEMS A/S, Aarhus N (DK)

(72) Inventors: Mu Wei, Solbjerg (DK); Kouroush Nayebi, Ikast (DK); Søren Kappelgaard, Arhus N (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/621,581

(22) PCT Filed: May 16, 2018

(86) PCT No.: PCT/DK2018/050107
§ 371 (c)(1),
(2) Date: Dec. 11, 2019

(87) PCT Pub. No.: WO2018/228645
PCT Pub. Date: Dec. 20, 2018

(65) Prior Publication Data
US 2020/0169093 A1    May 28, 2020

(30) Foreign Application Priority Data

Jun. 12, 2017   (DK) .................. 2017 70455

(51) Int. Cl.
*H02J 3/48*     (2006.01)
*F03D 7/02*     (2006.01)
*H02J 3/38*     (2006.01)

(52) U.S. Cl.
CPC .............. *H02J 3/48* (2013.01); *F03D 7/0272* (2013.01); *H02J 3/381* (2013.01); *H02J 2300/28* (2020.01)

(58) Field of Classification Search
CPC ........................................................ H02J 3/48
(Continued)

(56) References Cited

U.S. PATENT DOCUMENTS

2011/0187106 A1   8/2011   Ichinose et al.
2011/0215577 A1   9/2011   Martin Da Silva et al.
(Continued)

FOREIGN PATENT DOCUMENTS

CN     106786807 A     5/2017
EP       2902624 A1    8/2015
(Continued)

OTHER PUBLICATIONS

PCT Notification of Transmittal of the international Search Report and the Written Opinion of the International Searching Authority, or the Declaration for PCT/DK2018/05017 dated Aug. 16, 2018.
(Continued)

*Primary Examiner* — Joseph Chang
(74) *Attorney, Agent, or Firm* — Patterson + Sheridan, LLP

(57) ABSTRACT

The invention relates to a method for correcting deviations of power produced by a power plant which includes at least one wind turbine generator and possibly other types of power generating units. The power deviations, i.e. deviations from a power reference for the power plant, are determined as energy errors. The invention addresses solutions for determining and compensating the energy errors.

20 Claims, 3 Drawing Sheets

(58) Field of Classification Search
USPC .................................................. 307/43, 78
See application file for complete search history.

(56) References Cited

U.S. PATENT DOCUMENTS

| | | | | |
|---|---|---|---|---|
| 2011/0307109 | A1* | 12/2011 | Sri-Jayantha | G06Q 10/04 |
| | | | | 700/291 |
| 2014/0152105 | A1 | 6/2014 | Yasugi et al. | |
| 2018/0230969 | A1* | 8/2018 | Figueroa | H02J 3/46 |
| 2019/0020198 | A1* | 1/2019 | Beekmann | F03D 7/0284 |

FOREIGN PATENT DOCUMENTS

| | | |
|---|---|---|
| EP | 2905864 A1 | 8/2015 |
| EP | 2921699 A1 | 9/2015 |
| EP | 3116087 A1 | 1/2017 |
| WO | 2013167141 A1 | 11/2013 |
| WO | 2018228645 A1 | 12/2018 |

OTHER PUBLICATIONS

Danish Patent and Trademark Office 1st Technical Examination for PA 2017 70455 dated Nov. 13, 2017.

\* cited by examiner

CONTROL OF ENERGY PRODUCTION ERRORS IN A WIND PARK

FIELD OF THE INVENTION

The invention relates to control of park of power production units, particularly to a park comprising wind turbine generators or a park comprising a mix of wind turbine generators and other energy producing units.

BACKGROUND OF THE INVENTION

Power plants such as wind turbine parks which include a plurality of wind turbine generators or power plants which includes a different power generating units such as wind turbine generators and solar panels are controlled to deliver a desired amount of power according to a power reference. A wind turbine park is also known as a wind farm, wind park or a wind power plant. Wind turbine generators are also known simply as turbines or wind turbines. A central power plant controller may be used for controlling the power production.

A drop or increase in the wind speed or incident solar power may result in a corresponding drop or increase of produced power from the power generating units affected by the change in wind speed or solar power. The deviation of the produced power may be compensated by changing the power set-points for other power generating units which may not be affected by e.g. a wind speed drop so that the power reference for the entire power plant in still satisfied. However, due to limitations of components participating in the power plant's active power generation control, inaccuracies in the power control are inevitable. For example, due to bandwidth limitations, the control signals for compensating the deviations in the produced power may be delayed which may cause energy errors in the energy production.

Thus, inherent limitations of the central power plant controller and all the components participating in the control of active power of the power plant lead to control inaccuracies. Due to the control inaccuracies, power errors between the power reference and the generated power are inevitable. The sum of power errors during a period of time may lead to energy errors, i.e. deviations in the produced energy relative to the desired energy production.

Accordingly, there is a need to improve power control of power plants such as power plants which includes wind turbine generators. Particularly, there is a need to improve the accuracy of power production or production of electric energy.

US2015035282 discloses a power control system of an electrical generation unit comprising regulation means of the instantaneous power generated, means for determining a signal indicative of the instantaneous power generated and means for determining, from the signal indicative of the instantaneous power generated in a time interval, an average power signal generated, and further comprising average power regulation means configured to modify an operating parameter of the regulation means of the instantaneous power generated in accordance with the error between an average reference power signal and the average power signal generated.

SUMMARY OF THE INVENTION

It is an object of the invention to improve the control of a power plants which comprises one or more wind turbine generators, particularly to improve the accuracy of power control of such power plants.

In a first aspect of the invention there is provided a method for controlling power generation from a power generation system which comprises a plurality of power generating units including at least one wind turbine generator, where the power generation system is connected to an electrical power grid for supplying power from the power generating units to the electrical power grid, the method comprises during a first period, determining an energy error based on a power reference for a first selection of the power generating units and power produced by the first selection of the power generating units during the first period, determining a modified power reference for a second selection of the power generating units based on the energy error, during a second period located after the first period, compensating the energy error by distributing the modified power reference among the second selection of power generating units.

Advantageously, the determination of the energy error during a first period and compensation of the energy error during a second period located after the first period provides a reliable method for compensating energy error in a power generation system, i.e. a power plant. The compensation of the energy error provides a solution for addressing the control inaccuracies of the control system for controlling power generation of power plants. By means of the compensation, the average power or energy production can be adjusted, e.g. according to a demand from a grid operator. The separation of the period for determining the energy error and the period for compensating may be advantageous for power generation systems due to the complexity of the power control of such systems.

The capability of using a second selection of power generating units which may be different from the first selection enables use of the most beneficial power generating unit for compensating the energy error. The modified power reference may be distributed in different ways, e.g. by equal shares, among the power generating units selected for the second selection.

According to an embodiment, the first period has a predetermined length. Advantageously, the use of a predetermined period of time for determining the energy error provides a simple implementation. Furthermore, the use of a predetermined period of time enables a simple compensation scheme for determining and compensating errors. For example, the compensation scheme can be predetermined in the sense that start times and length of the first period and/or the second periods are predetermined or can be calculated/determined in advance.

According to an embodiment, the subsequent second period is initiated at a predetermined time after the end of the first period. Advantageously, by use of predetermined times for initiating the second period, the energy error compensation method may be arranged as a predetermined compensation scheme with predetermined lengths of the first and/or second periods and predetermined start times for the first and/or second periods.

According to an embodiment, the determination of the energy error and the compensation of the energy error are performed alternately during alternating first and second periods. Accordingly, the determination and compensation of energy errors could be arranged as alternating separate periods for determining and compensating the energy error. In this way, the possible energy errors are determined and compensated repeatedly.

According to an embodiment the second period comprises a plurality of second sub-periods. For example, the plurality of sub-periods of the second period may be arranged for compensating the energy error by use of different power generating units over the plurality of sub-periods. As another example, the plurality of sub-periods may be used for compensating fractions, e.g. predetermined percentages, of the energy error so that a first sub-period may be used for compensating a part of the energy error, the second sub-period may be used for compensating a remaining part of the energy error which was not compensated during the first sub-period and so forth. The lengths of the sub-periods may predetermined, possibly fixed, or the length could be determined dependent on the size of the energy error. The number of the plurality of sub-periods may be fixed or adjustable, e.g. dependent on the size of the energy error. Thus, according to an embodiment, each of the second sub-periods has a predetermined length.

According to an embodiment, the method further comprises
- during the second period, determining a further energy error in parallel with compensating the initial power error,
- determining the modified power reference for the second selection of the power generating units based on the further energy error, and
- during the second period or a period located after the second period, compensating the further energy error by distributing the modified power reference among the second selection of power generating units.

Advantageously, the method for compensating energy error may be modified so that energy errors are also determined in parallel with compensating the energy error. The parallel determination of errors may imply that the determination of the energy error is performed simultaneously with the compensation during the same or at least partly overlapping periods of time.

According to an embodiment, the modified power reference is determined additionally dependent on a power error limit which limits a size of modification of the modified power reference. Advantageously, it may be avoided that the modified power reference is set to high, e.g. to a level which is too high relative to capabilities of the power generating units. If the modified power reference is set too high, this may induce further power production inaccuracies.

According to an embodiment, the energy error is determined so that it additionally includes a remaining energy error which has not been compensated during a previous second period. Advantageously, energy errors which has not been compensated may be included in a subsequent determination of new energy error, e.g. an energy error determined during a subsequent first period.

According to an embodiment, the remaining energy error is determined based on a difference between an energy error limit and the energy error determined for a previous first period. Advantageously, if a maximum is set on the maximum energy error which can be compensated, the remaining energy error can be compensated in a subsequent period, e.g. a sub-period of the second period, or the remaining energy error can be included in a subsequently determined energy error.

According to an embodiment, the first and second selection of the power generating units consist of the same one or more power generating units.

According to an embodiment the second selection of the power generating units comprises at least one power generating unit which is not comprised by the first selection of the power generating units. Advantageously, the first and second selections may include different power generating units, e.g. so that power generating units having a better potential for compensating the error than the power generating units causing the error can be used for compensating.

According to an embodiment, the modified power reference for the second selection of the power generating units is determined based on a fraction of the energy error for the first selection of power generating units and an additional energy error for the at least one power generating unit which is not comprised by the first selection. Accordingly, the compensation may both include the energy error from the first selection and from power generating unit of the second selection which are not comprised by the first selection.

According to an embodiment, the method comprises selecting the second selection of power generating units so that the second selection comprises different power generating units over different periods of time. Advantageously, different power generating units may be used over time, e.g. in order to distribute the additional load caused by the compensation actions for compensating energy errors.

A second aspect of the invention relates to a central controller for controlling power generation from a power generation system which comprises a plurality of power generating units including at least one wind turbine generator, where the power generation system is connected to an electrical power grid for supplying power from the power generating units to the electrical power grid, where central controller is arranged to perform the method according to the first aspect.

A second aspect of the invention relates to a computer program product having instructions which, when executed, cause a computing device or a computing system to perform the method according to the first aspect.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1:
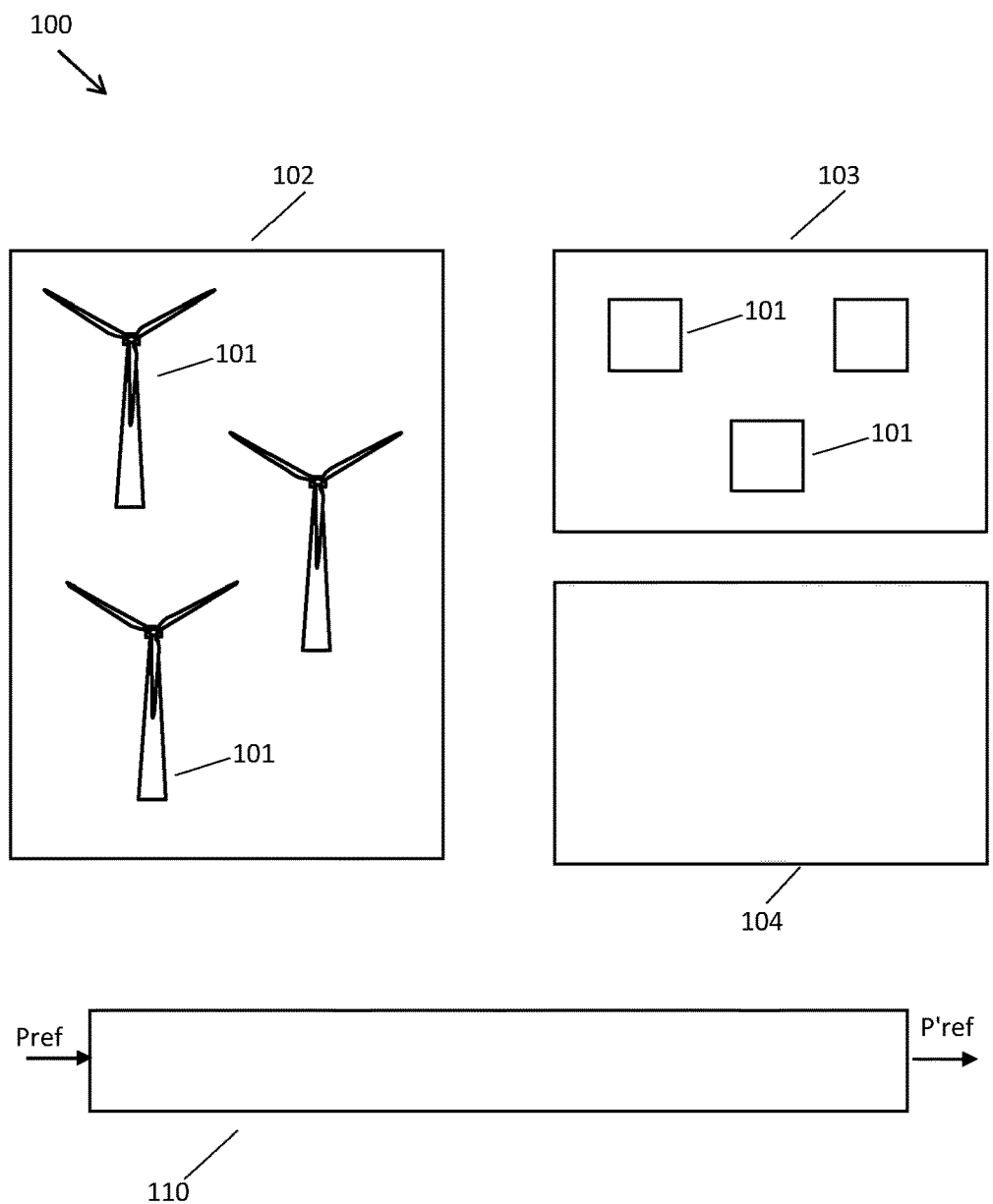
FIG. 1 shows a power generation system which comprises a plurality of power generating units, including one or more wind turbine generators. The system also comprises a central power controller.

FIG. 1 shows a power generation system 100 which comprises a plurality of power generating units 101 here shown as wind turbine generators. In general, the power generating units 101 may consist of different types of power generation units, e.g. different types of renewable power generating units such as solar power units (e.g. photovoltaic solar panels) and wind turbine generators. The different types of power generating unit 101 may also include fossil based power production units, e.g. diesel engines. According to an embodiment, at least one of the power generating units 101 of the power generation system 100 is a wind turbine generator.

The power generation system 100 may consist of different groups or selections 102,103,104 of power generating units 101. The power generating units 101 may be selected, e.g. during operation, to form different groups or different selections. For example, the power generating units 101 may be grouped into first and second selections 102, 103 of power generating units 101. The selection 102, 103 may consist of different types or the same type of the power generating units 101 and the selections may be changed over time. Clearly, the power generating units 101 may be grouped into one, two or more selections.

A selection 102-104 may comprise the same type of power generating units 101 or a mix of different types of power generating units 101, e.g. a mix of wind turbine generators and solar power units.

The first and second selection 102, 103 of the power generating units may be identical and, therefore, consist of the same one or more power generating units 101. Alternatively, the second selection 103 may be different from the first selection. Accordingly, the second selection 103 may comprise at least one power generating unit which is not comprised by the first selection 102.

The power generation system is connectable with an electrical power grid (not shown) for supplying power from the power generating units 101 to the electrical power grid. The connection with the power grid may be made through a point of common coupling to which all, or at least a plurality, of the power generating units 101 is connected.

The power generation system 100 is controlled by a central controller 110, also known as a power plant controller, a plant controller or farm controller. The central controller 110 is arranged to control power generation from the power generating units 101 e.g. according to a power reference Pref which defines the desired power to be supplied to the grid from the power generation system 100 or from a selection 102-104 of the power generation system 100. Accordingly, the power reference Pref may be a power reference Pref_selection1, Pref_selection2 for a specific selection 102-104 of power generating units 101 or a power reference for all power generating units 101 of the power generation system 100.

Furthermore, the central controller may be arranged to divide the power generating unit 101 into selections or groups 102, 103, 104. The division of power generation units may be performed automatically by the central controller or be supported by the central controller 110 in response to an external request.

As explained below, the power generation system such as the central controller 110 or other processing unit is arranged to determine a modified power reference P'ref for the purpose of compensating power errors. As will be clearer from the description below, the modified power reference P'ref can be a power reference for the same power generating units 101 as controlled on basis of the power reference Pref, or the modified power reference P'ref can be a power reference for a selection of power generating units 101 which comprise other power generating units 101 than controlled on basis of the power reference Pref or which comprise the same power generating units 101 as controlled on basis of the power reference Pref plus other power generating units 101.

For example, the modified power reference P'ref may be a power reference P'ref_selection1 for the same first selection 102 as controlled on basis of Pref_selection1; the modified power reference P'ref may be a power reference P'ref_selection2 for a second selection 103 while a different first selection 102 is controlled on basis of Pref_selection1; the modified power reference P'ref may be a power reference P'ref_selection1+2 for both the first and second selections 102, 103 while the first selection 102 is controlled on basis of the power reference Pref_selection1.

In general, the power generation system 100 may be configured so that the selection of power generating units 101 controlled by the power reference Pref and the modified power reference P'ref is adjusted or adapted according to need or constraints over time.

The wind turbine generator 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine generator is controllable to produce power, i.e. active power, corresponding to a power setpoint, i.e. an active power setpoint provided by the central controller 110. The output power may be adjusted according to the power setpoint by adjusting the pitch of the rotor blades 103 or by controlling the power converter to adjust the power production. Accordingly, the power setpoint is used for controlling the amount of wind power to be extracted by the wind turbine. In general, embodiments of the invention relates to control of active power. For convenience, the term "active" may be omitted in different contexts.

Figure 2:
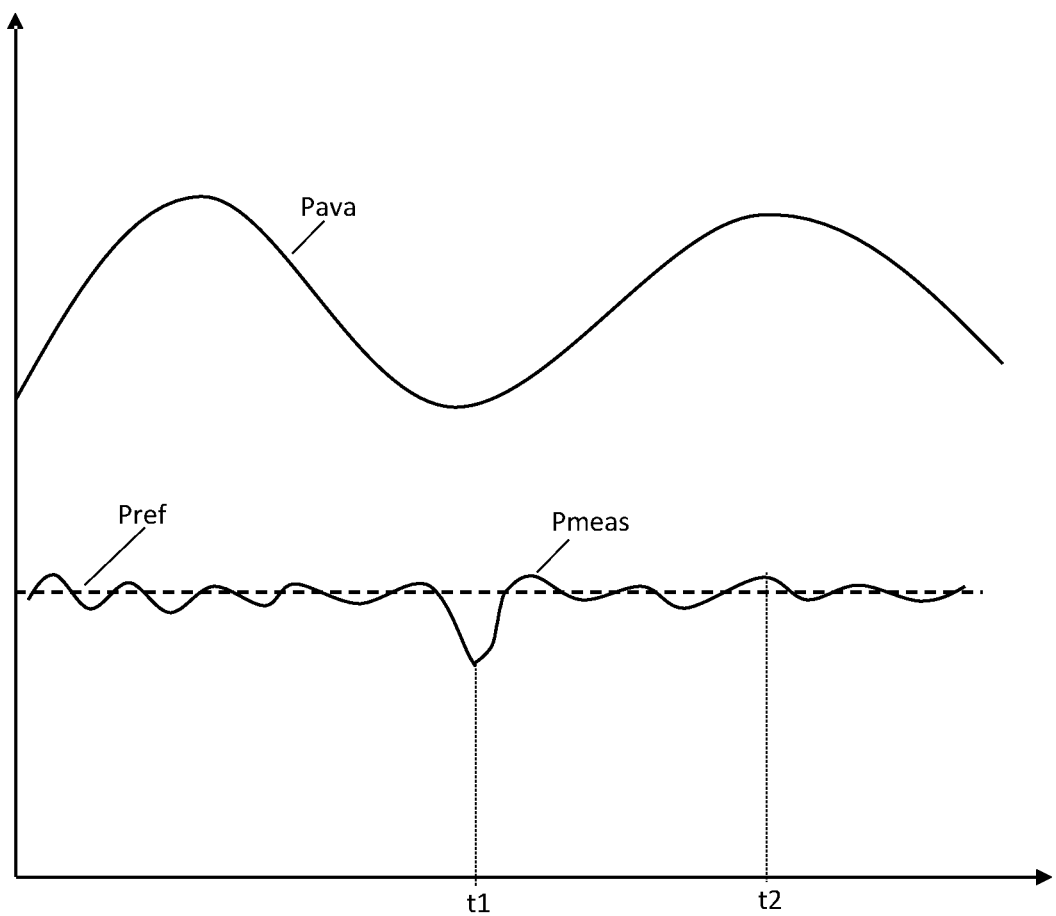
FIG. 2 illustrates inaccuracies in power productions in connection with controlling a power generation system to generate a power according to a desired power reference.

FIG. 2 illustrates a problem with controlling a power generation system 100 to generate a power according to a desired power reference Pref. Pmeas (solid line) illustrates produced active power from the power generation system, i.e. the active power supplied to the power grid. Pava illustrates the total plant level available power, i.e. the power available for generation of electric power by the power generating units 101. Thus, Pava may include a combination of different sources of power, e.g. wind and solar power. Pref (dotted line) is the power reference for the desired power production of the power generation system 100.

In an example, Pmeas illustrates the produced active power from wind turbine generators 101, Pava illustrates the total plant level available wind power and Pref illustrates the power reference for a selection of the wind turbine generators.

In the example in FIG. 2, the power generation system 100 is operated in a curtailed mode, i.e. where the power reference Pref is below the available amount of power Pava.

In a power generation system 100 which includes a mix of different types of power generating units 101, the available amount of power Pava may correspond to the power available from different sources, e.g. from wind and sun light. Alternatively, the available amount of power Pava could exclusively define the available wind power in a power generation system 100 including a mix of different types of power generating units 101, or a power generation system 100 including only wind turbine generators 101.

Power setpoints for the power generating units 101 are calculated and dispatched to the power generating units 101 based on the predicted future active power production capability for each unit 101.

In an example of wind turbine generators, if the central controller reacts as fast as the wind speed changes and all the control related signals are with very low time delay compared with the loop time of the power control of the central controller 110, then the central controller's power control would be very accurate and follow the power reference Pref. In case a wind turbine generator has a significant wind speed drop, the central controller 110 can generate higher setpoints for other wind turbine generators or other power generating units 101 having a capacity to increase power production. In this way, the loss of power can be compensated and the total power production according to the power reference Pref can be maintained.

Due to the control capability limit of the whole power plant, for example the central controller's 100 slow reactive time, the generation unit's 101 slow reactive time, communication signal propagation delays in the control system and other issues, control inaccuracies may be generated.

Accordingly, the control related signals of the central controller 110, e.g. the generation of power setpoints for the power generating unit 101 are generated with a significant time delay.

Consequently, due to fluctuations in wind speed, inaccuracies in the control of power from the power plant 100 are inevitable. The inaccuracies in power control may cause power errors between the power reference Pref and the produced active power Pmeas. The power errors may lead to energy errors of the produced energy from the power generation system 100.

To some extent, the capability of the central controller 110 has reached a limit so that the accuracy cannot be further improved in view of the control algorithm used by the controller. Embodiments of the present invention addresses solutions for mitigating problems caused by these inaccuracies of power control and resulting energy errors.

An example of the inaccuracy of the central controller 110 as described above is explained with reference to FIG. 2. FIG. 2 shows the inaccuracy arising from a power loss. However, the inaccuracy could also be caused by an overproduction of power.

The power generation system is in curtailed operation (Pref<Pava). Due to a sudden wind drop around time t1, the power produced by one or more wind turbine generators decreases resulting in a drop of Pmeas. This drop occurs even though the total plant level available wind power Pava is above the power reference Pref. The central controller is supposed to use other wind turbine generators or wind generating units 101 to compensate this power production drop. However, due to different limitations the central controller 110 cannot react fast enough compared with the wind speed change which results in the power production dip around time t1. Examples of such limitations include that the power generating units 101 do not read the power setpoint from the central controller 110 continuously, but only at certain times; inherent factors relating to approximations of control values or delays of the central controller 110 and/or the power generating units 101; and other limitations of the power generation system 100.

The inaccuracies in the power production and resulting over- or under-productions may be caused by other reasons than fluctuating wind. As indicated in FIG. 2, due to inherent inaccuracies of the control system or other effects the produced active power Pmeas fluctuates around the reference Pref. For example, an overproduction around time t2 may lead to a difference between the desired energy production and the actual energy production. The over-production around time t2 may be cancelled out by succeeding under-productions. However, this need not be the case and, therefore, the over production at time t2 may result in a lasting power production error.

Embodiments of the invention also applies when the power generation system 100 is operated under full load, i.e. where the power reference Pref corresponds to the nominal power of the power generating units 101 of the first and/or second selections 102, 103. The nominal power may be below the available amount of power Pava.

Figure 3A:
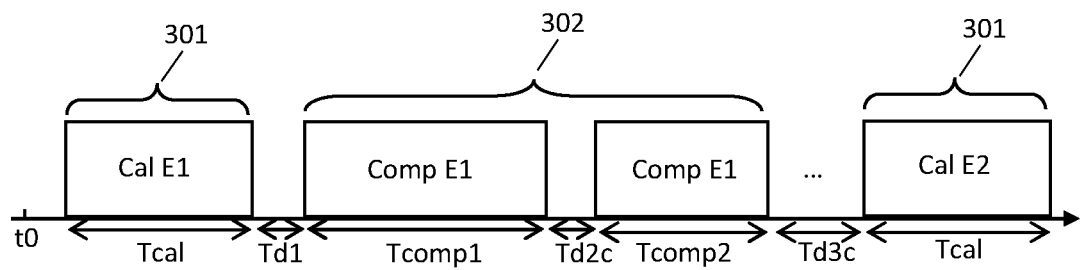
FIG. 3A illustrates a method for compensating inaccuracies of power produced by the power generation system.

FIG. 3A illustrates embodiments of methods for compensating energy errors due to inaccuracies of the control of active power production from the power generation system 100. The compensation is performed by determining energy errors E1, E2 and by compensating the energy errors during first and second periods 301, 302.

Figure 3B:
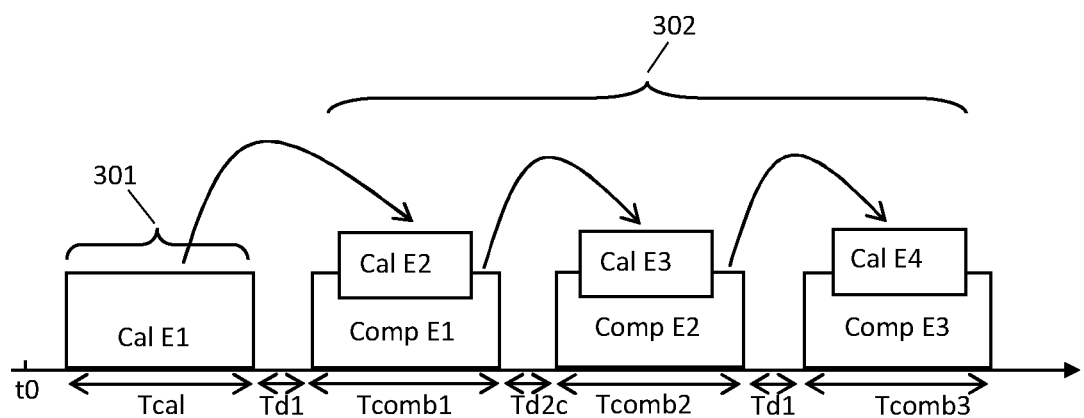
FIG. 3B illustrates an alternative method for compensating such inaccuracies.

Reference to energy errors E1, E2, E3, E4 in FIGS. 3A and 3B may in general be referred to as energy errors E in various embodiments.

According to an embodiment, during a first period 301, the energy error E1 is determined based on a power reference for a first selection 102 of the power generating units and based on power produced by the first selection 102 of the power generating units 101 during the first period.

For example, the energy error E1 may be determined by calculating the sum of differences between samples of the power reference Pref_i and samples of produced power values Pmeas_i for each sample time i during the first period 301, i.e. as the sum of samples of the power error Perror_i=Pref_i-Pmeas_i.

Based on the determined energy error E1, a modified power reference is determined for a second selection 103 of the power generating units 101. As noted above, the first and second selections 102, 103 of the power generating units may consist of the same power generating units 101 so that the modified power reference P'ref is actually determined for the first selection 102. Alternatively, the second selection 103 may have some power generating units 101 in common with the first selection or the second selection 103 may not have power generating units 101 in common with the first selection.

During a subsequent second period 302 located after the first period 301, the energy error is compensated by distributing the modified power reference P'ref among the second selection of power generating units 101.

For example, the modified power reference P'ref may be determined as Pref+E1/Tcomp, i.e. as the original power reference Pref for one or more selections 102, 103 of power generating units 101 plus the average compensation power E1/Tcomp determined from the energy error E1 and the period of time Tcomp wherein the energy error E1 should be compensated. The time Tcomp may be the period of the entire second period 302, the time of a single a sub-period Tcomp1, Tcomp2 of the second period 302, the sum of sub-periods Tcomp1, Tcomp2 of the second period 302 or other compensation times within the second period 302.

In another example, the power reference Pref is the power reference Pref_selection1 for a first selection 102 and the modified power reference P'ref is a modified power reference P'ref_selection2 for a second selection 103. In this case the modified power reference P'ref_selection2 may be determined as Pref_selection2+E'1/Tcomp. In this case the energy error E1 is may be determined as the sum of energy errors Eloop1, Eloop2 for the first and second selections 102, 103, i.e. as the sum of samples of the power error for each selection over the first period 301: Perror_selection1_$i$+ Perror_selection2_$i$; where Perror_selection1_$i$=Pref_selection1_$i$–Pmeas_selection1_$i$ and Perror_selection2_$i$=Pref_selection2_$i$–Pmeas_selection2_$i$.

In general, the energy error E1 may be determined based on one or more of the energy errors Eloop1, Eloop2 for the selections 102-104. For example, the modified power reference P'ref_selection2 may be determined only based on Eloop1 for the first selection, e.g. if is not relevant to compensate the energy error Eloop2 for the second selection.

The modified power reference P'ref may be distributed by dividing the power reference into power setpoints, i.e. individual power references, for each of the power generating unit 101 comprised by the second selection 103.

The first period 301 may have a predetermined length or duration Tcal. The length of the first period 301 may be set, e.g. by an operator of the power generation system 100, or otherwise, e.g. according to predetermined look-up tables with entries of lengths of the period which may be selected according to various conditions such as weather conditions. In any case, the first period has a predetermined length in the sense that the duration of the period is fixed when the computation of the energy error is initiated.

The subsequent second period 302 may be initiated at a predetermined time Td1 after the end of the first period 301. For example, the subsequent second period 302 may be initiated immediately after the end of the first period 301, i.e. so that Td1 is zero. Like the length of the first period 101, the delay time Td1 is predetermined in the sense that the duration of Td1 is fixed when delay time Td1 is initiated.

Due to the predetermined delay time Td1, the subsequent second period may be initiated independent on external conditions such as the available wind energy or other weather conditions.

As illustrated, the second period 302 may include one or more second sub-periods Tcomp1, Tcomp2. The number of the one or more second sub-periods Tcomp1, Tcomp2 contained within the second period may be fixed or may be variable, e.g. dependent on the size of the energy error E1 determined during the previous first period.

According to an embodiment, the length of the second period 302, one of the sub-periods Tcomp1, Tcomp2, or the sum of the sub-periods within the second period 302 may be equal to the length of the calculation period Tcal of the first period 301.

The length of the sub-periods Tcomp1, Tcomp2 may be fixed or predetermined, i.e. so that the end of each sub-period is set in advance. Similarly, the length of the second period 302 may be pre-determined so that the end of the second period 302 is set in advance.

A sub-period Tcomp2 may be delayed compared to a previous sub-period Tcomp1 by a predetermined delay time Td2$c$ which may have a zero or non-zero value.

The modified power reference P'ref may be determined dependent on a power error limit which limits how much the power reference Pref can be changed or how much a power reference Pref_selection1, Pref_selection2 for a given selection 102-104 can be changed. Thus, the maximum size of modification for a modified power reference for a given selection 102-104, i.e. relative to a previous power reference for that selection, may be limited according to the power error limit.

For example, the average compensation power E/Tcomp used for determining the modified power reference P'ref may be limited according to the maximum power error Perror_$i$ determined during the previous first period 301—e.g. a fraction (less than one) of the maximum power error Perror_$i$ determined during the previous first period 301. In another example, the limit of the modification of a power reference be determined based on a percentage of the nominal power of the second selection 103 of power generating units 101 or other power limits. Thus, the power error limit may be embodied by said maximum power error Perror_$i$, a percentage of the nominal power, e.g. of the second selection 103 or other suitable power limit.

The limitation on the modification of the power error may improve accuracy of the control of the power reference Pref. That is, if the magnitude of the modification of the power reference becomes too large this could introduce further inaccuracies and, thereby, worsen the overall accuracy of the power control.

After the second period 302, a new first period 301 may be initiated after a zero or non-zero delay period Td3$c$ of a predetermined length. Accordingly, the determination of the energy error and the compensation of the energy error are performed alternately during alternating first and second periods 301, 302.

The initial first period 301 denoted Cal E1 in FIG. 3A, may be an initial first period without an associated history of previously calculated energy errors E and compensation of these errors.

During a subsequent first period 301, i.e. a first period Cal E2 located subsequent to the initial first period Cal E1, the energy error E may be determined so that it additionally includes a remaining energy error which has not been compensated during a previous second period 302.

As an example, the remaining energy error may be determined based on a difference between an energy error limit and the energy error determined for a previous first period. Accordingly, if a limit for the maximum energy error that can be compensated is set during a second period and the previously determined energy error is greater than that limit, the remaining energy error may be added to the energy error calculated during a subsequent first period 301.

The first, second and possibly further selections 102, 103 of power generating units 101 may be controlled by respective first, second and possibly further control loops of the central controller 110. As, previously described, each of the selections or groups 102, 103 of power generating units 101 may have an individual power reference, e.g. Pref_selection1 and Pref_selection2 for the first and second selections 102, 103. As explained above, the energy errors may be computed individually for the first and second selections 102, 103 of power generating units 101, e.g. as Eloop1 and Eloop2 for the first and second selections.

The energy error, e.g. Eloop1 for the first selection 102, may be compensated by the first selection 102 or by one or more selections 102, 103. In case, the energy error for a first selection 102 (or two or more selections) is compensated by one or more other selections 103 (or one or more other selections 103 plus the first selection), the energy error to be compensated may be determined as the sum of energy errors for the first selection 102 and the one or more other selections 103. For example, the energy error Eloop1 for the first selection 102 may be compensated by the second selection 103 in which case the energy error to be compensated by the second selection 103 is given by Eloop1+Eloop2.

In case the energy error E for the first selection 102 is distributed among one or more selections 102, 103 (which may or may not include the first selection), the energy error E may be distributed according to predetermined shares, e.g. so that a first selection 102 is given a share of 10% (or a share of 0%), the second selection is given a share of 70%. The remaining share may be compensated by other selections or possibly the remaining share is not compensated.

Accordingly, the modified power reference for the second selection 103 of the power generating units 101 may be determined based on a fraction of the energy error for the first selection 102 of power generating units and an additional energy error for the at least one power generating unit which is not comprised by the first selection such as the energy error for the second selection 103.

The selection of power generating units 101 for compensating an energy error E may be changed over time. For example, the shares of an energy error E to be compensated by a second selection 103 over time, e.g. for different second periods 302 or different second sub-periods Tcomp1, Tcomp2 may be varied. Similarly, the decision of which selections 102, 103 or which power generating unit that should be used for compensating energy error may be varied over time. Thus, the central controller 110 may be configured so that control loops can be adapted to control different power generating units 101 in variable selections 101-104 of power generating units 101.

Accordingly, power generation units 101 included in a second selection 103 for compensating an energy error E may be varied over time, i.e. so that the second selection 103 comprises different power generating units 101 over different periods of time. This may be achieved by selecting the second selection of power generating units according to different conditions (e.g. environmental) or predetermined rules which may change over time.

For example, the second selection 103 may include different or partly overlapping selections of power generating units 101 for different sub-periods Tcomp1-Tcomp2.

For example, when the power generation system 100 or selections of the power generating units 101 are operated at full load, individual power generating units 101 such as wind turbine generators may be allowed to produce power above the nominal power but only for short periods of time in order to avoid significant degradation of the lifetime. For example, due to an energy underproduction during a first period 301, there is need for an overproduction during a second period 302 in order to compensate the energy error. Different power generating units 101, e.g. selections of wind turbine generators 101, could form different second selections 103 of e.g. wind turbine generators which are associated with different sub-periods Tcomp1-2. The duration of the sub-periods Tcomp1-2 could be set according to an allowed time during which the wind turbine generator, or other power generating unit 101, is allowed to generate power above the nominal power. In this way, the power generating units 101 are capable of compensating an energy error E in the form of an under-production, without excessive loading of the power generating units, even when the power generating units 101 are operated at nominal power production, by distributing the compensation of the energy error E over different power generating unit 101 over time.

FIG. 3B illustrates embodiments of modifications of the method described in connection with FIG. 3A for compensating inaccuracies. Similarly to the FIG. 3A example, the initial energy error E1 from the first period 301 is compensated during the second period 302 located after the first period 301. In addition to compensating the initial energy error during the second period 302, a further energy error E2 is determined in parallel with compensating the initial power E1 error. Thus, during the second period 302, e.g. during a sub-period Tcomp1, the initial error is compensated while a possible energy error E2 generated during this second period is determined. As illustrated, during a subsequent sub-period Tcomp2, the energy error E2 from the previous period is compensated, while a possible energy error E3 generated during that period is determined. In this way, energy errors may be determined and compensated during a plurality of sub-periods located in a second period 302. In principle, the parallel compensation and determination of energy errors E could be continued substantially infinitely during a second period 302. Alternatively, the parallel compensation and determination of energy errors E could be repeated during a finite number of sub-periods Tcomp1-Tcomp3 within the second period 302, and the second period 302 could be followed by a new first period 301 for determination of an energy error E1 without performing compensation of an energy error.

The determination of the energy errors E2-E4 during the second period 302 in parallel with compensation of a previously determined energy error may be performed by computing the energy error as the sum of samples of the power error Perror_i=Pref'_i−Pmeas_i, where Pref'_i represent the modified power reference P'ref determined for the second period 302 or a sub-period Tcomp1 thereof.

Accordingly, the method of FIG. 3B further includes determination of the modified power reference P'ref for the second selection 103 of the power generating units 101 based on the further energy error E2-E4. During the second period 302, e.g. during a sub-period Tcomp2, or during period located after the second period 302, the further energy error is compensated by distributing the modified power reference among the second selection of power generating units.

The central controller 110, other computation device or a combination thereof, may be arranged to determine the energy error E, the modified power reference P'ref, the distribution of the modified power reference to individual or groups of power generating units 101, the number of compensation periods Tcomp1, Tcomp2, the delay times Td1, Td2c, Td3c and other quantities to be determined or calculated according to various embodiments described herein.

Embodiments of invention such as the central controller 110 or parts thereof can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc.

should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling power generation from a power generation system which comprises a plurality of power generating units including at least one wind turbine generator, where the power generation system is connected to an electrical power grid for supplying power from the power generating units to the electrical power grid, the method comprising:
    during a first period, determining an energy error based on a power reference for a first selection of one or more power generating units from the plurality of power generating units and power produced by the first selection of the power generating units during the first period;
    determining a modified power reference for a second selection of one or more power generating units from the plurality of power generating units based on the energy error; and
    during a second period located after the first period, compensating the energy error by distributing the modified power reference among the second selection of power generating units.

2. The method according to claim 1, where the first period has a predetermined length.

3. The method according to claim 1, where the subsequent second period is initiated at a predetermined time after the end of the first period.

4. The method according to claim 1, where the determination of the energy error and the compensation of the energy error are performed alternately during alternating first and second periods.

5. The method according to claim 1, where the second period comprises a plurality of second sub-periods.

6. The method according to claim 5, where each of the second sub-periods has a predetermined length.

7. The method according to claim 1, further comprising:
    during the second period, determining a further energy error in parallel with compensating the energy error from the first period;
    determining the modified power reference for the second selection of the power generating units based on the further energy error; and
    during the second period or a period located after the second period, compensating the further energy error by distributing the modified power reference among the second selection of power generating units.

8. The method according to claim 1, where the modified power reference is determined additionally dependent on a power error limit which limits a size of modification of the modified power reference.

9. The method according to claim 1, where the energy error is determined so that it additionally includes a remaining energy error which has not been compensated during a previous second period.

10. The method according to claim 9, where the remaining energy error is determined based on a difference between an energy error limit and the energy error determined for a previous first period.

11. The method according to claim 1, where the first and second selections of the power generating units consist of the same one or more power generating units.

12. The method according to claim 1, where the second selection of the power generating units comprises at least one power generating unit which is not in the first selection of the power generating units.

13. The method according to claim 12, where the modified power reference for the second selection of the power generating units is determined based on a fraction of the energy error for the first selection of power generating units and an additional energy error for the at least one power generating unit which is not included in the first selection.

14. The method according to claim 1, wherein the second selection comprises selecting different power generating units over different periods of time.

15. A central controller for controlling power generation from a power generation system which comprises a plurality of power generating units including at least one wind turbine generator, where the power generation system is connected to an electrical power grid for supplying power from the power generating units to the electrical power grid, where the central controller comprises an I/O interface, a memory and a processor which, when executing instructions, performs an operation, comprising:
    during a first period, determining an energy error based on a power reference for a first selection of one or more power generating units from the plurality of power generating units and power produced by the first selection of the power generating units during the first period;
    determining a modified power reference for a second selection of one or more power generating units from the plurality of power generating units based on the energy error; and
    during a second period located after the first period, compensating the energy error by distributing the modified power reference among the second selection of power generating units.

16. The central controller according to claim 15, where the first period has a predetermined length.

17. The central controller according to claim 15, where the subsequent second period is initiated at a predetermined time after the end of the first period.

18. The central controller according to claim 15, where the determination of the energy error and the compensation of the energy error are performed alternately during alternating first and second periods.

19. The central controller according to claim 15, where the second period comprises a plurality of second sub-periods.

20. A computer program product having instructions which, when executed, cause one or more processors to perform an operation for controlling power generation from a power generation system which comprises a plurality of power generating units including at least one wind turbine generator, where the power generation system is connected to an electrical power grid for supplying power from the power generating units to the electrical power grid; the operation, comprising:
    during a first period, determining an energy error based on a power reference for a first selection of one or more power generating units from the plurality of power generating units and power produced by the first selection of the power generating units during the first period;

determining a modified power reference for a second selection of one or more power generating units from the plurality of power generating units based on the energy error; and during a second period located after the first period, compensating the energy error by distributing the modified power reference among the second selection of power generating units.

\* \* \* \* \*